United States Patent Office 3,236,811
Patented Feb. 22, 1966

3,236,811
CROSS-LINKING POLYURETHANE CASTINGS WITH SECONDARY AND TERTIARY ALCOHOLS
Konrad Ellegast, Leichlingen, Erwin Müller, Leverkusen, and Hans Holtschmidt, Cologne-Stammheim, Germany, assignors to Farbenfabriken Bayer Aktiengesellschaft, Leverkusen, Germany, a German corporation
No Drawing. Filed Aug. 31, 1960, Ser. No. 53,031
Claims priority, application Germany, Sept. 4, 1959, F 29,311
7 Claims. (Cl. 260—75)

This invention relates to improved polyurethane castings and an improved process for the preparation thereof. More particularly, this invention relates to an improved method of casting polyurethane elastomers.

The preparation of substantially nonporous polyurethane plastics by a casting technique has achieved great commercial importance. In most casting processes an excess of an organic polyisocyanate is reacted in a first step with a polyhydroxyl compound such as an hydroxyl polyester or polyalkylene ether glycol to prepare an isocyanate-modified prepolymer which has terminal isocyanate groups. The —NCO terminated prepolymer is subsequently reacted with a chain-extending agent such as a glycol and cast in a mold to form a nonporus casting. The hardness of the polyurethane product is controlled to a large extent by the amount of excess isocyanate which is used and large excesses have heretofore been tried. For example, it has been proposed to use as much as 12 mols of diisocyanate per mol of a dihydroxy polyester. The diisocyanate modified polyester and the large excess of isocyanate are then mixed with a cross-linking agent. The mixture sets up and becomes solid immediately and there is insufficient time to pour it into a mold. The so-called casting time (i.e. the time between mixing the prepolymer and cross-linker) is practically nil. A casting time of about one minute can be retained if the excess of isocyanate in the prepolymer is kept below about 200 percent. In this event, however, only the usual castings can be prepared. Exceptionally hard polyurethane castings require a large excess of isocyanate. The greater the excess of isocyanate, the harder the elastomer will be and the shorter the casting time will be.

It is, therefore, an object of this invention to provide an improved process for casting polyurethane plastics which is substantially devoid of the foregoing disadvantages. Another object of this invention is to provide a process for the preparation of polyurethane castings of improved hardness. A further object of the invention is to provide a process for the preparation of polyurethane castings from large excesses of organic polyisocyanates. Still another object of this invention is to provide a process for the preparation of polyurethane plastics which have improved modulus and high hardness values.

The foregoing objects and others which will become apparent from the following description are accomplished in accordance with the invention, generally speaking, by providing polyurethane castings obtained from an isocyanate-modified prepolymer and saturated hydrocarbon secondary or tertiary alcohols containing at least two hydroxyl groups, said isocyanate-modified prepolymer having been obtained by mixing an organic compound containing terminal hydroxyl groups and having a molecular weight of at least about 800 under substantially anhydrous conditions with an excess of from about 300 equivalent mol percent to about 900 equivalent mol percent of an organic polyisocyanate based on the hydroxyl groups of said organic compound. The resulting polyurethane plastic has improved modulus and very high hardness. Furthermore, the isocyanate-modified prepolymer and the tertiary or secondary alcohol may be mixed without immediate reaction so that time is available in which to cast the mixture in a mold.

Any suitable organic compound containing a plurality of hydroxyl groups and having a molecular weight of at least about 800 may be used for reaction with the excess of organic polyisocyanate to prepare the prepolymer. A preferred type of organic compound having a molecular weight of at least 800 is one containing hydroxyl groups as the sole groups thereof which are reactive with —NCO groups. Such a compound suitably has the formula $R(OH)_n$ wherein R is a polyvalent organic radical having the valence $n$ and $n$ is 2 or 3. R may suitably be composed of the elements C, H, N, S and/or O. Among the suitable compounds are hydroxyl polyesters, polyhydric polyalkylene ethers, polyhydric polythioethers, polyacetals and the like. The preferred organic compounds have a molecular weight of from about 1000 to about 3000, hydroxyl numbers between about 30 and about 80 and acid numbers below about 2. Any suitable hydroxyl polyester may be used such as those obtained, for example, from a polycarboxylic acid and a polyhydric alcohol. Of course, the term "hydroxyl polyester" includes hydroxyl polyester amides which may be obtained from the above-defined ingredients with the addition of some organic amine or amino alcohol such as ethylene diamine, propylene diamine, ethanol amine and the like. Any suitable polyhydric alcohol may be used such as, for example, ethylene glycol, propylene glycol, 1,4-butanediol, trimethylol propane, pentaerythritol and the like. Any suitable polycarboxylic acid may be used such as, for example, adipic acid, succinic acid, phthalic acid, terephthalic acid, 1,3,5-benzene tricarboxylic acid and the like.

Any suitable polyhydric polyalkylene ether may be used such as, for example, those obtained by the condensation of an alkylene oxide either alone or together with a polyhydric alcohol. Any suitable alkylene oxide may be used such as, for example, ethylene oxide, propylene oxide, butylene oxide, amylene oxide and the like as well as epihalohydrins such as epichlorohydrin and aralkylene oxides such as styrene oxide and the like. Any suitably polyhydric alcohol may be used such as those more particularly set forth above for use in the preparation of the polyester. It is preferred to use polyalkylene ether glycols such as, for example, polybutylene glycol, polypropylene glycol, polyethylene glycol and the like. The polyhydric polyalkylene ethers may be prepared by any suitable process such as that disclosed by Wurtz in 1859, Encyclopedia of Chemical Technology, vol. 7, pp. 257–262, published by Interscience Publishers, Inc., 1951, and in U.S. Patent 1,922,459.

Any suitable polyhydric polythioether may be used such as, for example, that obtained by the condensation of thiodiglycol with itself or with an alkylene oxide or polyhydric alcohol as set forth above.

Any suitable polyacetal may be used such as, for example, those obtained by condensing butanedioxyethyl glycol or diethylene glycol with formaldehyde.

Any suitable organic polyisocyanate may be used but it is preferred to employ an organic diisocyanate with the above-mentioned difunctional compounds so that a substantially linear prepolymer is obtained. Examples are, diphenylmethane-4,4'-diisocyanate, 2,4-toluylene diisocyanate, 2,6-toluylene diisocyanate, 1,5-naphthylene diisocyanate, hexamethylene diisocyanate, p-phenylene diisocyanate, m-phenylene diisocyanate, diphenyl sulphone-4,4'-diisocyanate, p,p',p''-triphenyl methane triisocyanate, furfurylidene diisocyanate and the like.

Any suitable saturated hydrocarbon secondary or tertiary alcohol may be used provided it has a least two hydroxyl groups. Small amounts of cross-linking agents containing primary hydroxyl groups may also be used provided that the bulk of the cross-linking agent, i.e. at least about 75 percent based on the number of hydroxyl groups present for reaction with the terminal isocyanate groups is the secondary and/or tertiary alcohol. These secondary and/or tertiary alcohols must contain predominantly secondary and/or tertiary hydroxyl groups. Preferably the sole hydroxyl groups of these compounds are bonded to secondary or tertiary carbon atoms. They are preferably monomeric or dimeric glycols with molecular weights below about 500. Suitable compounds are, for example, butane-2,3-diol, hexane-2,5-diol, heptane-2,4-diol, nonane-2,4-diol, pinacol, 2-methyl-pentane-2,4-diol, 1,2-cyclo-pentanediol, 1,4-cyclohexanediol, 1,3,5-cyclohexanetriol and the like.

The reaction of the organic compound having a molecular weight above 800 with the organic diisocyanate preferably takes place with exclusion of moisture at elevated temperatures most advantageously between about 80° C. and about 150° C. Less than enough saturated secondary and/or tertiary alcohol is thereafter added to the prepolymer than is necessary to react with all of the free —NCO groups. The mixture is quickly and thoroughly stirred and while it is still liquid, it is poured into a mold in which the mass hardens into the elastomeric polyurethane plastic. Further heating is sometimes desirable. By adding acid substances, for example, hydrochloric acid, which are, if necessary, added to the cross-linking component, the casting time of the reaction mixture can be still further extended. Conversely, the casting time and the mold-release time of the reaction mixture can be shortened by adding basic substances such as tertiary amines, for example, N-methylmorpholine or metal catalysts, for example, dibutyl tin di-2-ethyl hexoate. The molded or shaped elements which are obtained can be finally cured by subsequent heating.

The products of this invention are useful for the preparation of gear wheels, door stops, shock absorbers for air hammers and the like.

The invention is further illustrated by the following examples in which the parts are by weight unless otherwise indicated.

Example 1

About 500 parts of a glycol-adipic acid polyester (—OH number about 56; acid number below about 1) are dehydrated at about 135° C./12 mm. About 300 parts of 1,5-naphthylene diisocyanate (about 475 percent excess) are incorporated by stirring at about 145° C. and allowed to react for about 10 minutes, the temperature falling in the first stage and rising again due to the heat of reaction being developed. Thereafter, about 130 parts of hexane-2,5-diol are incorporated by stirring at approximately 130° C. and the hot melt is poured into molds. The pouring time is about 2 minutes. The material can be removed from the mold after another 5 minutes and the article can then be finally heated in the open at about 110° C. for about 24 hours. The hard elastic material has the following mechanical properties:

Shore hardness A _____ 98
Shore hardness D _____ 60
Tensile strength _____kg./cm.$^2$__ 270
Breaking elongation _____percent__ 500
Permanent elongation _____do____ 40
Load at 20 percent elongation _____kg./cm.$^2$__ 122
Load at 300 percent elongation _____kg./cm.$^2$__ 202
Elasticity _____percent__ 30
Resistance to further tearing _____kg./cm__ 104

Example 2

About 500 parts of 4,4'-diphenylmethane diisocyanate (about 700 percent excess) are added to about 500 parts of an anhydrous adipic acid-glycol polyester (—OH number about 56; molecular weight about 2000) at about 130° C., the mixture is allowed to react for about 10 minutes and then about 150 parts of butane-2,3-diol are incorporated by stirring. The mixture is capable of being poured for about 1½ minutes. After about three minutes, the parts are removed from the mold and cured in a heating chamber at about 110° C.

Shore hardness A _____ 99
Shore hardness D _____ 66
Tensile strength _____kg./cm.$^2$__ 280
Breaking elongation _____percent__ 350
Permanent elongation _____do____ 46
Load at 20 percent elongation _____kg./cm.$^2$__ 150
Load at 300 percent elongation _____kg./cm.$^2$__ 256
Elasticity _____percent__ 35
Resistance to further tearing _____kg./cm__ 102

Example 3

About 500 parts of an adipic acid glycol polyester (—OH number about 55) are dehydrated at about 130° C./12 mm. and then mixed with about 600 parts of 4,4'-diphenyl methane diisocyanate (about 860 percent excess) at about 140° C. After reaction for about 10 minutes in vacuo, about 240 parts of hexane-2,5-diol are incorporated by stirring and the mixture, which can be poured for about 1½ minutes, is cast in molds at a temperature of about 110° C. After a curing time of about 24 hours at about 110° C., a material is obtained with the following physical properties:

Shore hardness A _____ 99
Shore hardness D _____ 63
Tensile strength _____kg./cm.$^2$__ 300
Breaking elongation _____percent__ 360
Permanent elongation _____do____ 26
Load at 20 percent elongation _____kg./cm.$^2$__ 124
Load at 300 percent elongation _____kg./cm.$^2$__ 262
Elasticity _____percent__ 34
Resistance to further tearing _____kg./cm__ 98

Example 4

About 500 parts of a polythioether of thiodiglycol (—OH number about 70) are dehydrated in vacuo at about 130° C. and then reacted for about 10 minutes with about 250 parts of 1,5-naphthylene diisocyanate at about 120° C. About 82.5 parts of butane-2,3-diol are incorporated by stirring and the mixture is poured into molds, the mixture being pourable for about 1½ minutes. After approximately another 4 minutes, the articles are removed from the mold and finally heated for about 10 hours at about 110° C.

Shore hardness A _____ 96
Shore hardness D _____ 60
Tensile strength _____kg./cm.$^2$__ 200
Breaking elongation _____percent__ 250
Permanent elongation _____do____ 24
Load at 20 percent elongation _____kg./cm.$^2$__ 193
Elasticity _____percent__ 40
Resistance to further tearing _____kg./cm__ 60
DIN abrasion _____mm.$^3$__ 56

Example 5

About 500 parts of a polythioether (—OH number about 51; molecular weight about 2200) are dehydrated for about 3 hours at about 130° C./12 mm. and then mixed with about 300 parts of 1,5-naphthylene diisocyanate at about 130° C. After reaction for about 10 minutes in vacuo, about 110 parts of hexane-2,5-diol are introduced and the mass in cast in hot molds. The casting time is about 1¼ minutes and the articles can be removed from the mold after approximately another 5 minutes. By finally heating the material at about 100°

C. for about 5 hours, a product is obtained which has the following physical values:

| | |
|---|---|
| Shore hardness A | 99 |
| Shore hardness D | 65 |
| Tensile strength _____kg./cm.$^2$ | 210 |
| Breaking elongation _____percent | 200 |
| Permanent elongation _____do | 24 |
| Load at 20 percent elongation ____kg./cm.$^2$ | 188 |
| Elasticity _____percent | 38 |

*Example 6*

About 500 parts of a linear poly-propylene glycol ether (—OH number about 56) are dehydrated for about 2 hours at about 130° C./12 mm. Hg and then reacted in vacuo at about 135° C. with about 300 parts of 1.5-naphthylene diisocyanate; after about 10 minutes, about 100 parts of 2,3-butanediol are incorporated by stirring and the mixture is poured into hot molds. The pouring time is about 1¼ minutes and the article can be removed from the mold after approximately another 5 minutes. After a final heating time of about 24 hours at about 100° C., a material is obtained which has the following physical properties:

| | |
|---|---|
| Shore hardness A | 95 |
| Shore hardness D | 54 |
| Tensile strength _____kg./cm.$^2$ | 210 |
| Breaking elongation _____percent | 340 |
| Permanent elongation _____do | 25 |
| Load at 20 percent elongation ____kg./cm.$^2$ | 112 |
| Load at 300 percent elongation ____kg./cm.$^2$ | 186 |
| Elasticity _____percent | 34 |
| Resistance to further tearing ____kg./cm | 78 |

*Example 7*

About 500 parts of an hydroxyl polyester of adipic acid and ethylene glycol (—OH number about 56) are dehydrated for about 2 hours at about 135° C./12 mm. Hg. The dehydrated polyester is heated to about 165° C., about 400 parts of 1,5-naphthylene diisocyanate (about 660 percent excess) are then added and allowed to react for about 10 minutes in vacuo. About 185 parts of 2-methylpentane-2,4-diol are then incorporated by stirring and the mixture is cast in molds heated to about 120° C. The pouring time is about three minutes and the article can be removed from the mold after about 15 minutes. After final heating for about 24 hours at about 110° C., a material is obtained which has the following mechanical properties:

| | |
|---|---|
| Shore hardness A | 96 |
| Shore hardness D | 62 |
| Tensile strength _____kg./cm.$^2$ | 340 |
| Breaking elongation _____percent | 370 |
| Permanent elongation _____do | 63 |
| Load at 20 percent elongation ____kg./cm.$^2$ | 127 |
| Load at 300 percent elongation ____kg./cm.$^2$ | 264 |
| Elasticity _____percent | 23 |
| Resistance to further tearing ____kg./cm | 91 |

It is to be understood that the foregoing examples are for the purpose of illustration only and that any other organic compound having a molecular weight of at least about 800 and containing terminal hydroxyl groups, organic polyisocyanate or secondary or tertiary hydroxyl cross-linking agent could have been used in the foregoing examples in accordance with the preceding disclosure with satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of polyurethane castings which comprises mixing an excess of from about 300 equivalent mol percent to about 900 equivalent mol percent of an organic polyisocyanate with an organic compound selected from the group consisting of polyesters, polyalkylene ethers, polythioethers, and polyacetals having a molecular weight of at least about 800 and containing a plurality of hydroxyl groups in a first step and subsequently mixing the product of the first step with a saturated alcohol selected from the group consisting solely of secondary and tertiary alcohols containing at least two hydroxyl groups bonded to secondary and tertiary atoms and having a molecular weight below about 500 to form polyurethane having —NCO groups.

2. The process of claim 1 wherein the organic polyisocyanate is an organic diisocyanate.

3. The process of claim 1 wherein the organic compound has a molecular weight within the range of from about 1,000 to about 3,000, a hydroxyl number of from about 30 to about 80, and an acid number below about 2.

4. The process of claim 1 wherein the hydroxyl polyester is obtained from a polycarboxylic acid and a polyhydric alcohol.

5. The process of claim 1 wherein the product of the first step is reacted with said group member under substantially anhydrous conditions.

6. A process for the preparation of a polyurethane casting which comprises mixing an excess of from about 300 equivalent mol percent to about 900 equivalent mol percent of an organic polyisocyanate with an organic compound selected from the group consisting of polyester, polyalkylene ethers, polythioethers and polyacetals having a molecular weight of at least about 800 and containing a plurality of hydroxyl groups in a first step and subsequently mixing the product of the first step with butane-2,3-diol.

7. The process of claim 6 wherein said organic polyisocyanate is 4,4'-diphenyl methane diisocyanate.

References Cited by the Examiner

UNITED STATES PATENTS

| | | | |
|---|---|---|---|
| 2,621,166 | 12/1952 | Schmidt et al. | 260—75 |
| 2,683,728 | 7/1954 | Mastin | 260—75 |
| 2,814,606 | 11/1957 | Stilmar | 260—75 |
| 2,929,800 | 3/1960 | Hill | 260—77.5 |
| 2,933,478 | 4/1960 | Young et al. | 260—75 |
| 2,999,823 | 9/1961 | Dombrow | 260—75 |
| 3,004,933 | 10/1961 | Muller et al. | 260—75 |
| 3,007,899 | 11/1961 | Urs | 260—75 |
| 3,047,530 | 7/1962 | Nischk et al. | 260—75 |

LEON J. BERCOVITZ, *Primary Examiner.*

MILTON STERMAN, JOSEPH R. LIBERMAN,
*Examiners.*